No. 659,730. Patented Oct. 16, 1900.
A. E. ELLINWOOD.
AIR EXTRACTOR FOR PNEUMATIC TIRES IN CONSTRUCTION.
(Application filed Mar. 7, 1900.)

(No Model.) 2 Sheets—Sheet 1.

Witnesses:

Inventor:
Augustus E. Ellinwood,
By Humphrey & Humphrey,
Attorneys.

No. 659,730. Patented Oct. 16, 1900.
A. E. ELLINWOOD.
AIR EXTRACTOR FOR PNEUMATIC TIRES IN CONSTRUCTION.
(Application filed Mar. 7, 1900.)
(No Model.) 2 Sheets—Sheet 2.
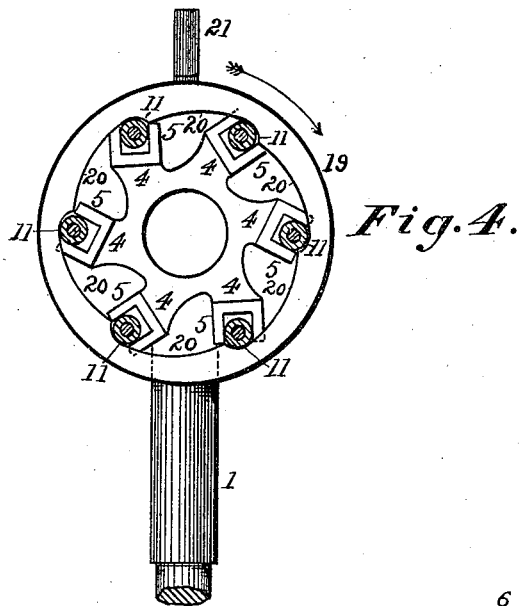
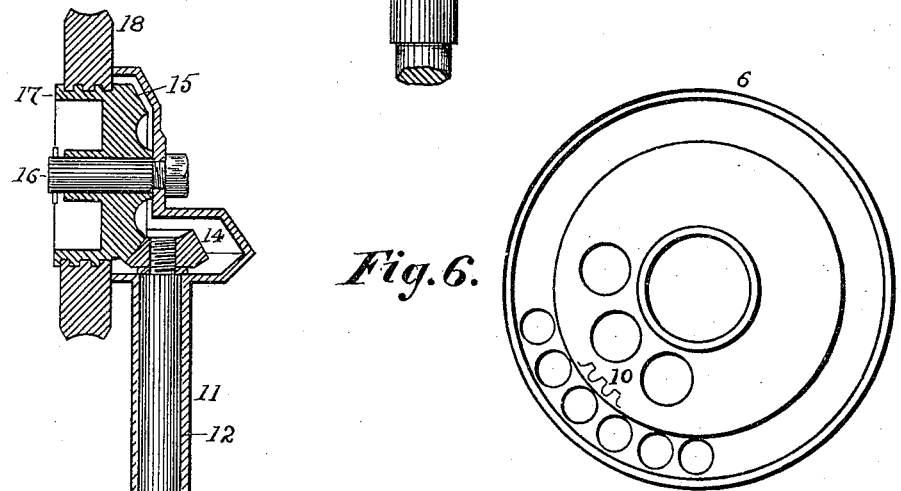
Witnesses:
R. H. Stuart
Wm. L. Good
Inventor
Augustus E. Ellinwood,
by Humphrey & Humphrey,
Attorneys.

UNITED STATES PATENT OFFICE.

AUGUSTUS E. ELLINWOOD, OF AKRON, OHIO, ASSIGNOR TO THE GOODYEAR TIRE AND RUBBER COMPANY, OF SAME PLACE.

AIR-EXTRACTOR FOR PNEUMATIC TIRES IN CONSTRUCTION.

SPECIFICATION forming part of Letters Patent No. 659,730, dated October 16, 1900.

Application filed March 7, 1900. Serial No. 7,653. (No model.)

*To all whom it may concern:*

Be it known that I, AUGUSTUS E. ELLINWOOD, a citizen of the United States, residing at Akron, in the county of Summit and State of Ohio, have invented a certain new and useful Improvement in Air-Extractors for Pneumatic Tires in Construction, of which the following is a specification.

My invention has a general relation to improvements in the manufacture of pneumatic tires for bicycles and other vehicles, and it has especial relation to devices for expelling the air or moisture that may be inclosed between the layers that form the walls of the tire in the process of construction. These tires are ordinarily constructed by rolling the layers of rubber and fabric upon a mandrel to form the tube, and in this process there will remain an inequality of the thickness of the inner layers at their edges, which forms an air-space which will contain air and possibly moisture, the expansion of which under vulcanizing heat forms blisters in the structure of the tire, and thereby impairs its strength and durability.

The object of my invention is to provide a simple and effective apparatus by which this air and any moisture may be expelled before removing the mandrel for the purpose of uniting its ends preparatory to vulcanization.

To the aforesaid object my invention consists in the peculiar and novel construction, arrangement, and combination of parts hereinafter described and then specifically pointed out in the claims, reference being had to the accompanying drawings, forming a part of this specification.

Figure 1:
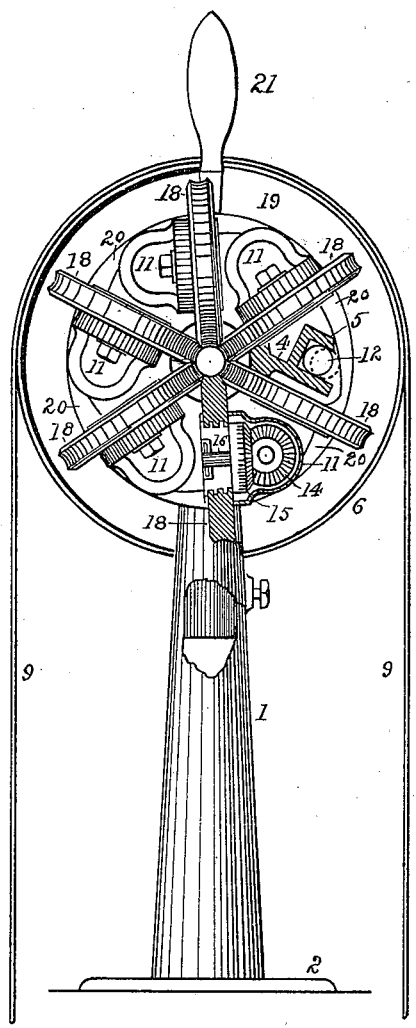
Figure 2:
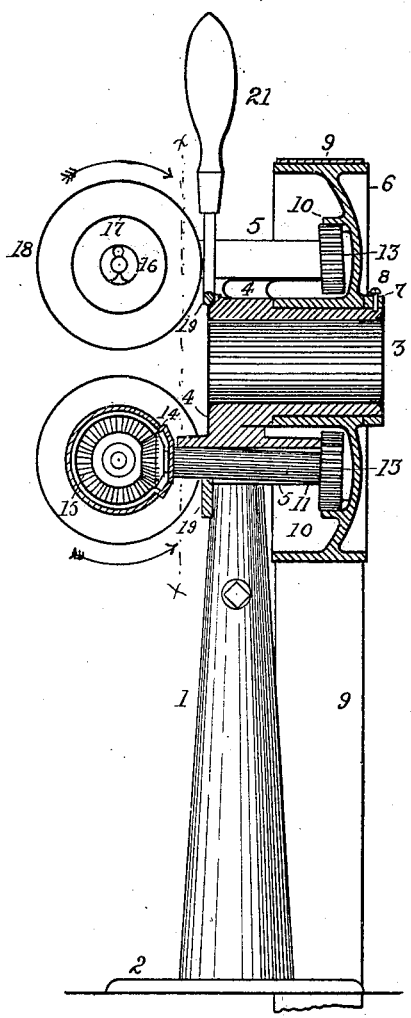
Figure 3:
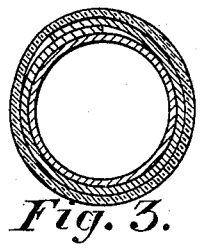

In the accompanying drawings, in which similar reference-numerals indicate like parts in the different views, Figure 1 is a front elevation of my machine with a part in section and a part broken away to more clearly exhibit the construction; Fig. 2, a side elevation of the same, with the part above the supporting-pillar in vertical section; Fig. 3, a section of a tire to show the air-space; Fig. 4, a front elevation of the cam-wheel, looking from the left at the line X X of Fig. 2, with the bevel-gear shafts in section; Fig. 5, an enlarged central section of one of the grooved wheels, with its gear and meshing-gear, shaft, and casing; and Fig. 6, the internal driving-gear detached.

Referring to the drawings, 1 is a post mounted on a base 2, which post supports a fixed cylindrical head 3, from the front end of which extend approximately tangentially a number of like arms 4, having transverse ends 5, that project to the front and back substantially parallel with the axis of the head 3 and which ends are in the form of a rectangular trough with their open sides outward. The back portion of the head 3 is turned smoothly, and on it is freely mounted a driving-pulley 6, held by a collar 7 and set-screw 8. The pulley 6 is turned by a belt 9 from any convenient source of power and has in its front face an internal gear 10. In each of the transverse ends 5 of the arms 4 freely rests a hollow case 11, having at its front end and integral with it a hood to inclose certain gear-wheels to be described. In each case 11 is fitted a revoluble shaft 12, bearing at its inner end a pinion 13, arranged to mesh in the internal gear 10. On the outer end of each shaft 12 is a bevel-pinion 14, that meshes in a bevel-gear 15, freely mounted on a wrist 16, secured in the hood of the case 11. From the face of the gear 15 and integral therewith is a cylindrical shell or hoop 17, having its outer face, grooved and mounted on this hoop is a rubber ring 18, having its periphery grooved and which, with the hoop 17, forms a complete wheel. By this construction and arrangement each of the six wheels thus constructed meet about the extended axis of the head 3 and lie in planes parallel therewith and radiating thereupon.

In front of and resting freely against the head 3 is a flat ring 19, having its inner periphery formed of a number of like eccentric cam-curves 20, equal in number with the arms 4, the lines of which curves, extended, pass approximately through the center lines of the shafts 12 and the outer lines of the cases 11 in section. The ring 19 incloses and rests on the ends of the cases 11 that project beyond the head 3, immediately back of the rubber rings 18, and rests at the back against the fronts of the grooved ends of the arms 4 and is provided with a handle 21, by which it may be partially rotated. By partially rotating the ring 19 in the direction of the arrow in Fig. 4 the hooded ends of the cases 11, with the wheels composed of the shells 17 and rings 18, will by means of the cam-curves 20 be simultaneously rocked toward the axial line of the head 3, thus bringing the faces of the grooved rings 18 about a common center.

In operation, motion being given to the pulley 6 by the belt 9, the wheels composed of the shells 17 and rings 18 are by means of mechanism just described caused to simultaneously revolve in the same direction. Mandrels covered with tires to be operated on are now successively passed through the head 3 and between the edges of the rings 18, by which they are simultaneously compressed on every side and the air and moisture expelled from between the layers that form the walls thereof.

Having thus described my invention, what I claim, and desire to secure by Letters Patent, is—

1. In a machine for expelling air from pneumatic tires supported on mandrels, the combination with a fixed head having like arms bearing trough-shaped ends, hollow cases resting in said ends, revoluble shafts in said cases bearing at one end pinions, a wheel having an internal gear adapted to mesh in said pinions at the opposite ends of said revoluble shafts, bevel-gears arranged to mesh in and to be driven by said bevel-pinions, and wheels having elastic grooved rims arranged to run with said bevel-gears, all arranged substantially as shown and described.

2. In a machine for expelling air from pneumatic tires supported on mandrels the combination with a fixed head having like arms bearing trough-shaped ends, hollow cases resting in said ends, revoluble shafts in said cases bearing at one end pinions, a wheel having an internal gear adapted to mesh in said pinions, bevel-pinions at the opposite ends of said revoluble shafts, bevel-gears arranged to mesh in and be driven by said bevel-pinions, wheels having elastic grooved rims arranged to run with said bevel-gears, and a cam-ring arranged to simultaneously press the ends of said revoluble shafts bearing the bevel-pinions toward a common center and to release them when desired, substantially as shown and described.

In testimony that I claim the above I hereunto set my hand in the presence of two subscribing witnesses.

AUGUSTUS E. ELLINWOOD.

In presence of—
C. P. HUMPHREY,
C. E. HUMPHREY.